United States Patent
Ikarashi

(10) Patent No.: US 12,333,273 B2
(45) Date of Patent: Jun. 17, 2025

(54) SECURE RIGHT SHIFT COMPUTATION SYSTEM, SECURE DIVISION SYSTEM, METHODS THEREFOR, SECURE COMPUTATION APPARATUS, AND PROGRAM

(71) Applicant: NIPPON TELEGRAPH AND TELEPHONE CORPORATION, Tokyo (JP)

(72) Inventor: Dai Ikarashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 1121 days.

(21) Appl. No.: 17/279,096

(22) PCT Filed: Oct. 10, 2019

(86) PCT No.: PCT/JP2019/039985
§ 371 (c)(1),
(2) Date: Mar. 24, 2021

(87) PCT Pub. No.: WO2020/075797
PCT Pub. Date: Apr. 16, 2020

(65) Prior Publication Data
US 2022/0060318 A1    Feb. 24, 2022

(30) Foreign Application Priority Data

Oct. 10, 2018  (JP) ................. 2018-191830

(51) Int. Cl.
| | |
|---|---|
| *G06F 7/544* | (2006.01) |
| *G06F 5/01* | (2006.01) |
| *H04L 9/08* | (2006.01) |

(52) U.S. Cl.
CPC ............... *G06F 7/544* (2013.01); *G06F 5/01* (2013.01); *H04L 9/085* (2013.01)

(58) Field of Classification Search
CPC ... H04L 9/0668; H04L 9/085; H04L 2209/46; G06F 21/602; G06F 21/72; G06F 7/544; G06F 7/584; G06F 5/01
See application file for complete search history.

(56) References Cited

U.S. PATENT DOCUMENTS

| | | |
|---|---|---|
| 2015/0193633 A1 | 7/2015 | Chida et al. |
| 2019/0163933 A1* | 5/2019 | Hamada ............... G06F 21/72 |

(Continued)

FOREIGN PATENT DOCUMENTS

WO    2018/034079 A1    2/2018

OTHER PUBLICATIONS

Boyle, Elette, et al. "Function secret sharing for mixed-mode and fixed-point secure computation." Annual International Conference on the Theory and Applications of Cryptographic Techniques. Cham: Springer International Publishing, 2021. (Year: 2021).*

(Continued)

*Primary Examiner* — Matthew D Sandifer
(74) *Attorney, Agent, or Firm* — XSENSUS LLP

(57) ABSTRACT

The present invention implements high-speed right shift computation and division in secure computation. According to the present invention, a public value multiplication part calculates $[a']=[2^u a]$ from a distributed value $[a]$ of a value "a." A first conversion part converts $[a']$ into additive secret sharing. A right shift computation part calculates $\langle s \rangle_i = \langle a' \rangle_i \gg b+u$. A second conversion part converts $\langle s \rangle$ into linear secret sharing. A first bit conversion part converts lower u bits of $\langle a' \rangle_i$ into $\{a'_i \bmod 2^u\}$. A quotient transfer part 16 obtains lower u bits of $-\Sigma_{i<m}\{a'_i \bmod 2^u\}$ as $\{q\}$. A second bit conversion part converts lower b+u bits of $\langle a' \rangle_i$ (Continued)

SECURE RIGHT SHIFT COMPUTATION SYSTEM 100(200)

into $\{a'_{iR}\}=\{a'_i \bmod 2^{b+u}\}$. An addition part calculates $\{z\}=\Sigma_{i<m}\{a'_{iR}\}+\{q\}$, and obtains a bit sequence $\{z_Q\}$ of a (b+u)-th bit and after of $\{z\}$. A third conversion part converts $\{q\}$ and $\{z_Q\}$ into linear secret sharing. An output computation part outputs $[s]-[2^{l-(b+u)}q]+[z_Q]$ as $[a\gg b]$.

5 Claims, 11 Drawing Sheets

(56) References Cited

U.S. PATENT DOCUMENTS

| | | | |
|---|---|---|---|
| 2019/0212986 A1 | 7/2019 | Araki et al. | |
| 2019/0229904 A1* | 7/2019 | Hamada | G06F 21/602 |
| 2023/0379151 A1* | 11/2023 | Ikarashi | H04L 9/3033 |
| 2023/0401033 A1* | 12/2023 | Ikarashi | G06F 7/49936 |

OTHER PUBLICATIONS

Morita, Hiraku, et al. "Secure division protocol and applications to privacy-preserving chi-squared tests." 2018 International Symposium on Information Theory and Its Applications (ISITA). IEEE, 2018. (Year: 2018).*

Catrina et al., "Secure Computation With Fixed-Point Numbers", International Conference on Financial Cryptography and Data Security FC2010, LNCS, vol. 6052, Springer, 2010, pp. 35-50.

Mishina et al., "Designs and Implementations of Efficient and Accurate Secret Logistic Regression", Proceedings of Computer Security Symposium 2018 (IPSJ Symposium Series), vol. 2018, No. 2, Information Processing Society of Japan, Oct. 15, 2018, pp. 1229-1236. (22 pages Including English Translation).

Bogdanov et al., "High-Performance Secure Multi-Party Computation for Data Mining Applications," International Journal of Information Security, vol. 11, Issue 6, pp. 403-418, Nov. 2012.

* cited by examiner

US 12,333,273 B2

SECURE RIGHT SHIFT COMPUTATION SYSTEM, SECURE DIVISION SYSTEM, METHODS THEREFOR, SECURE COMPUTATION APPARATUS, AND PROGRAM

CROSS-REFERENCE TO RELATED APPLICATIONS

The present application is based on PCT filing PCT/JP2019/039985, filed Oct. 10, 2019, which claims priority to JP 2018-191830, filed Oct. 10, 2018, the entire contents of each are incorporated herein by reference.

TECHNICAL FIELD

The present invention relates to a technique of performing right shift computation and division in secure computation.

BACKGROUND ART

Secure computation is a cryptographic technique of calculating an arbitrary function while data is concealed. Taking advantage of this feature, a data utilization form that does not leak data to both system operators and data users is expected. There are several methods for secure computation, and among them, it is known that ones that use secret sharing as a component have a small data processing unit and can perform high-speed processing.

Secret sharing is a method for converting confidential information into several fragments called shares. For example, there is secret sharing called a (k, n) threshold value method by which n shares are generated from confidential information, and secret can be restored from k or more shares, but the confidential information is not leaked from less than k shares. As specific configuration methods of secret sharing, methods such as Shamir secret sharing and duplicate secret sharing are known. In the present specification, one fragment of a value distributed by secret sharing is referred to as a "share." Also, an entire set of all shares is referred to as a "value that has been distributed" or "distributed value."

Right shift computation is one of basic computations on a computer or the like, and is used at various situations. For example, right shift computation can be used as computation that reduces numerical accuracy. In addition, division when a divisor is powers of two can be achieved by right shift computation. Non-patent literature 1 discloses a method for performing shift computation on an integer ring whose order is powers of two in secure computation.

PRIOR ART LITERATURE

Non-Patent Literature

Non-patent literature 1: D. Bogdanov, M. Niitsoo, T. Toft, and J. Willemson, "High-performance secure multi-party computation for data mining applications," International Journal of Information Security, Volume 11, Issue 6, Pages 403-418, November 2012.

SUMMARY OF THE INVENTION

Problems to be Solved by the Invention

However, since the method disclosed in Non-patent literature 1 can be used only on an integer ring whose order is powers of two, there is a problem in which an overflow will occur and calculation cannot be performed if computation that increases numerical accuracy such as multiplication on the field is repeated.

An objective of the present invention is to provide a secure computation technique that achieves high-speed right shift computation and division in view of the above technical problems.

Means to Solve the Problems

In order to solve the above problems, a secure right shift computation system of a first aspect of the present invention is a secure right shift computation system comprising m secure computation apparatuses, taking an input of a distributed value [a] of a value "a" and a shift amount "b," and calculating a distributed value [a>>b] of a value obtained by shifting the value "a" by "b" bits toward right, wherein [•] is a distributed value obtained by distributing a value "•" by first secret sharing, <•> is a distributed value obtained by distributing the value "•" by additive secret sharing, {•} is a distributed value obtained by distributing a bit expression of the value "•," the distributed value [•] and the distributed value <•> can be mutually converted, "a" is an arbitrary value, "b" is a shift amount, "m" is a distribution number of three or more, "u" is an integer of log m or more, "l" is a bit number of the value "a," and >> is a right shift operator, and wherein the secure computation apparatuses each include: a public value multiplication part that calculates a distributed value $[a']=[2^u a]$ by using the distributed value [a]; a first conversion part that converts the distributed value [a'] into a distributed value $<a'>=<a'>_0, \ldots, <a'>_{m-1}$ of the additive secret sharing; a right shift computation part that, for each integer i of 0 or more and less than m, generates a distributed value $<s>=<s>_0, \ldots, <s>_{m-1}$ by calculating $<s>_i=<a'>_i>>b+u$; a second conversion part that converts the distributed value <s> into a distributed value [s] of the first secret sharing; a first bit conversion part that converts lower u bits of a share $<a'>_i$ of the distributed value <a'> into a distributed value $\{a'_i \bmod 2^u\}$ of a bit expression for each integer i of 0 or more and less than m; a quotient transfer part that calculates lower u bits of $-\Sigma_{i<m}\{a'_i \bmod 2^u\}$ to obtain as a distributed value {q} of a bit expression by using the distributed value $\{a'_i \bmod 2^u\}$; a third conversion part that converts the distributed value {q} into a distributed value [q] of the first secret sharing; and an output computation part that calculates $[s]-[2^{l-(b+u)}q]+1$ to obtain as the distributed value [a>>b] by using the distributed values [s] and [q].

In order to solve the above problems, a secure division system of a second aspect of the present invention is a secure division system comprising three secure computation apparatuses, taking an input of a distributed value [a] of a dividend "a" and a divisor "d," and calculating a distributed value [a/d] of a division result a/d in which the dividend "a" is divided by the divisor "d" and a fractional part is truncated, wherein "p" is a prime number, [•] is a distributed value obtained by distributing a value "•" by first secret sharing with three shares, <•> is a distributed value obtained by distributing the value "•" by additive secret sharing with two shares, the distributed value [•] and the distributed value <•> can be mutually converted, "a" is a dividend, "d" is a divisor, and / is an operator that represents division in which a fractional part is truncated, and wherein the secure computation apparatuses each include: an input conversion part that converts the distributed value [a] into a distributed value $<a>=<a>_0, \ldots, <a>_1$ of the additive secret sharing; a public value multiplication part that calculates a distributed value $<a'>=<2a>$ and a value $d'=2d$ by using the distributed value [a] and the divisor "d"; a quotient transfer part that obtains a distributed value $<q>$ of a quotient "q" where a value a' is divided by the prime number p, by using the distributed value $<a'>$; a public division part that obtains a quotient p' and a residual r' where the prime number p is divided by the value d'; an approximation part that calculates $<b>_0=(<a'>_0+d'-1-r')/d'$ and $<b>_1=<a'>_1/d'$, to generate a distributed value $<b>=<b>_0, \ldots, <b>_1$ by using the distributed value $<a'>$, the value d', and the residual r'; an output computation part that calculates $<b>-(p'+1)<q>+1$ to obtain as a distributed value $<a/d>$ of the division result a/d by using the distributed values $<b>$ and $<q>$ and the quotient p'; and an output conversion part that converts the distributed value $<a/d>$ into the distributed value [a/d] of the first secret sharing.

In order to solve the above problems, a secure division system of a third aspect of the present invention is a secure division system comprising m secure computation apparatuses, taking an input of a distributed value [a] of a dividend "a" and a divisor "d," and calculating a distributed value [a/d] of a division result a/d in which the dividend "a" is divided by the divisor "d" and a fractional part is truncated, wherein p is a prime number, [•] is a distributed value obtained by distributing a value "•" by first secret sharing with m shares, $<•>$ is a distributed value obtained by distributing the value "•" by additive secret sharing with m shares, the distributed value [•] and the distributed value $<•>$ can be mutually converted, "a" is a dividend, "d" is a divisor, "m" is a distribution number of three or more, "u" is an integer of log m or more, and/is an operator that represents division in which a fractional part is truncated, and wherein the secure computation apparatuses each include: an input conversion part that converts the distributed value [a] into a distributed value $<a>=<a>_0, \ldots, <a>_{m-1}$ of the additive secret sharing; a public value multiplication part that calculates a distributed value $<a'>=<2^u a>$ and a value $d'=2^u d$ by using the distributed value [a] and the divisor "d"; a quotient transfer part that obtains a distributed value $<q>$ of a quotient "q" where a value a' is divided by the prime number p, by using the distributed value $<a'>$; a public division part that obtains a quotient p' and a residual r' where the prime number p is divided by the value d'; a flag setting part that obtains a flag z in which z=1 is set if $r' \geq d'/2$, and z=0 is set if $r'<d'/2$; an approximation part that generates a distributed value $<b>=<b>_0, \ldots, <b>_{m-1}$, for each integer i of 0 or more and less than m, by calculating $<b>_i=(<a'>_i+(d'-r')+(d'-r')/2)/d'$ if i=0 and calculating $<b>_i=<a'>_i/d'$ if i≠0; a rounding processing part that obtains a distributed value $<b'>=<b'>_0, \ldots, <b'>_{m-1}$, for each integer i of 0 or more and less than m, by calculating $<b'>_i=<p''>$ if a quotient p'' and a residual r'' obtained by dividing a share $<b>_i$ of the distributed value $<b>$ by the value d' satisfy $r'' \leq d'/2-1$ and calculating $<b'>_i=<p''+1>$ if $r'' \geq d'/2$; an output computation part that calculates $<b'>-(p'+z)<q>-1$ to obtain as a distributed value $<a/d>$ of the division result a/d by using the distributed values $<b'>$ and $<q>$, the quotient p', and the flag z; and an output conversion part that converts the distributed value $<a/d>$ into the distributed value [a/d] of the first secret sharing.

Effects of the Invention

According to the secure computation technique of the present invention, it is possible to achieve high-speed right shift computation and division in secure computation.

DETAILED DESCRIPTION OF THE EMBODIMENTS

Figure 1:
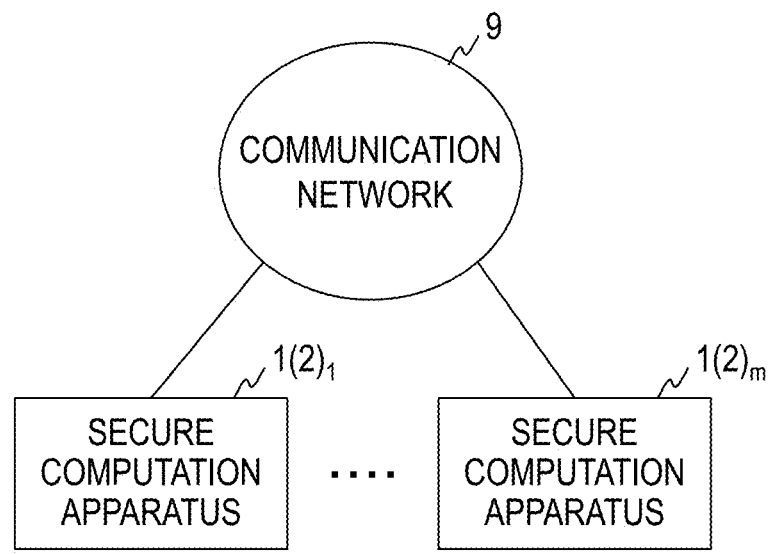
FIG. 1 is a diagram illustrating a functional configuration of a secure right shift computation system.

Hereinafter, embodiments of the present invention will be described in detail. In the drawings, configuration parts having the same functions are given the same numbers, and duplicate explanations are omitted. If a base of log is omitted in mathematical formulas and the like, the base is two.

First Embodiment

A first embodiment of the present invention is a secure right shift computation system and method that shift a number to be shifted toward the right by a given shift amount and output the shifted number while concealing the number to be shifted, which is a right shift target. An outline of a right shift protocol executed by the secure right shift computation system of the first embodiment will be described below. This protocol is a protocol on a Mersenne prime field. The Mersenne prime field is an important structure used in secret sharing-based secure computation (see Reference literature 1). [Reference literature 1] Naoto Kiribuch, Dai Ikarashi, Koki Hamada, and Ryo Kikuch "MEVAL3: A Library for Programmable Secure Computation," Symposium on Cryptography and Information Security (SCIS), pp. 1-8, 2018.

Right shift is integer division, but not a ring operation consisting of addition and multiplication. First, general integer division in Theorem 1 and right shift in its System 1 are expressed by a ring operation using a quotient "q" of additive secret sharing. The quotient "q" can be efficiently calculated by quotient transfer (see Reference literature 2). [Reference literature 2] Ryo Kikuchi, Dai Ikarashi, Takahiro Matsuda, Koki Hamada, and Koji Chida, "Efficient bit-decomposition and modulus-conversion protocols with an honest majority," Proceedings of Information Security and Privacy—23rd Australasian Conference (ACISP 2018), pp. 64-82, Jul. 11-13, 2018.

<Theorem 1: Quotient by Public Value on Integer Ring $Z_q$>

It is assumed that there are shares $a_0, a_{m-1}$ that satisfy $a=\Sigma_{i<m}a_i$ mod p, where an arbitrary distribution number $m \in N$, a prime number $p \in N$, a divisor $d \in N$, and a dividend $a \in R$. Here, for each i, non-negative integers $a_{iQ}$ and $a_{iR}$ are a quotient and a residual where $a_i$ is divided by d, respectively, non-negative integers $p_Q$ and $p_R$ are a quotient and a residual where p is divided by d, respectively, a non-negative integer q is a quotient where $\Sigma_{i<m}a_i$ is divided by p, and $z_Q$ is a quotient where $\Sigma_{i<m}a_{iR}+q(d-p_R)$ is divided by d. Then, a quotient $a_Q$ where "a" is divided by d is expressed by the following Formula (1).

$$a_Q = \Sigma_{i<m} a_{iQ} - (p_Q+1)q + z_Q \qquad (1)$$

<Proof of Theorem 1>

From the assumption $a = \Sigma_{i<m} a_i \bmod p$, "a" is a residual where $\Sigma_{i<m} a_i$ is divided by p. From the assumption "q is a quotient where $\Sigma_{i<m} a_i$ is divided by p," $\Sigma_{i<m} a_{iQ} = qp + a$. Since $a_i = a_{iQ}d + a_{iR}$ and $p = p_Q d + p_R$ from the assumption, $$a = (\Sigma_{i<m} a_{iQ})d + \Sigma_{aiR} - qp_Q d - qp_R = (\Sigma_{i<m} a_{iQ} - qp_Q)d + (\Sigma_{i<m} a_{iR} - qp_R).$$

Further assuming that $y_Q$ is a quotient where $\Sigma_{i<m} a_{iR} - qp_R$ is divided by d, then $$a_Q = (\Sigma_{i<m} a_{iQ} - qp_Q) + y_Q.$$

On the other hand, since $z_Q$ is a quotient where $\Sigma_{i<m} a_{iR} + q(d-p_R)$ is divided by d, $y_Q = z_Q - q$.

<System 1: Right Shift Formula on Mersenne Prime Field>

In Theorem 1, it is assumed that a prime bit length $l \in N$ is arbitrary and a shift bit number $b \in N$ is $b \leq l$ and the prime number $p = 2^l - 1$ and the divisor $d = 2^b$. Then, $z'_Q$ is a quotient where $\Sigma_{i<m} a_{iR} + q$ is divided by $2^b$, and $a_Q$ is expressed by the following Formula (2).

$$a_Q = \Sigma_{i<m} a_{iQ} - 2^{l-b} f + z'_Q \qquad (2)$$

<Proof of System 1>

It only needs to substitute $p = 2^l - 1$ and $d = 2^b$ in Formula (1).

<System 2: Quotient Transfer on Mersenne Prime Field>

It is assumed that, for an arbitrary distribution number $m \Sigma N$ and a Mersenne prime p, $u \Sigma N$ satisfies $\log m \leq u$, and $a_0, \ldots a_{m-1} \in Z_p$ satisfies $\Sigma_{i<m} a_i \bmod 2^u = 0$. At this time, if q is a quotient where $\Sigma_{i<m} a_i$ is divided by p, q is expressed by the following Formula (3).

$$q = -\Sigma_{i<m} a_i \bmod 2^u \qquad (3)$$

<Right Shift Protocol>

A right shift protocol executed in the embodiment is shown below. The protocol is calculated according to Formula (2) in System 1. Here, the following notation is used.

[•] is a value distributed by secret sharing, which is a form of input/output. It is necessary to be able to perform mutual conversion with addition, public value multiplication, and additive secret sharing and bit composition from a bit sequence. For example, linear secret sharing such as Shamir secret sharing and duplicate secret sharing can be used.

<•> is a value distributed by additive secret sharing. The additive secret sharing is secret sharing in which restoration is performed by addition. For example, simple additive secret sharing and duplicate secret sharing can be used.

{•} is a value distributed as a bit sequence. That is, it is a value in which a numerical value is expressed in bits as a sequence of values in which the bits have undergone secret sharing. For example, a sequence of duplicate secret sharing on $Z_2$ can be used.

[•], <•>, and {•} without subscripts represent entire distributed values. <•>$_i$, and {•}$_i$ with subscripts represent shares (here, i-th shares).

In duplicate secret sharing, a share held by each party is composed of a plurality of elements called "sub-shares" and elements having the same values are shared by a plurality of parties. The sub-shares are also handled as shares.

[Algorithm 1: Right Shift Protocol on Integer Ring $Z_q$]

Input: a number to be shifted [a] and a shift amount b

Parameters: a distribution number m of additive secret sharing and an integer u of log m or more Output: [a>>b] (Where, >> is a right shift operator and represents shifting each bit of "a" by "b" bits toward the right.)

1: To calculate $[a'] = [2^u a]$ by public value multiplication.

2: To convert [a'] into additive secret sharing to obtain <a'>.

3: To set <s> as $<s>_i = <a'>_i >> b+u$.

4: To convert <s> into linear secret sharing to obtain [s].

5: To distribute lower u bits of each $<a'>_i$ to obtain a bit expression $\{a'_i \bmod 2^u\}$ of $<a'>_i \bmod 2^u$.

6: To calculate lower u bits of $-\Sigma_{i<m}\{a'_i \bmod 2^u\}$ by an addition circuit and a sign inversion circuit. Since this output is equal to "q" by a quotient transfer theorem, it is set as {q}.

7: To distribute lower b+u bits of each $<a'>_i$ to obtain a bit expression $\{a'_{iR}\}$ of $<a'>_i \bmod 2^{b+u}$.

8: To calculate $\{z\} = \Sigma_{i<m}\{a'_{iR}\} + \{q\}$ by the addition circuit to set a bit sequence of a (b+u)-th bit (0 start) and after as $\{z_Q\}$. At this time, a processing result by the addition circuit of the u bits obtained in step 6 can be partially reused.

9: To convert {q} and $\{z_Q\}$ into linear secret sharing by bit composition to obtain [q] and $[z_Q]$.

10: To output $[s] - [2^{l-(b+u)}q] + [z_Q]$.

All of the mutual conversion of additive secret sharing including linear secret sharing and duplicate secret sharing used in the above protocol, the bit composition, and the sharing of each bit of duplicate secret sharing are described in Reference literature 2 above.

<Secure Right Shift Computation System 100>

A secure right shift computation system 100 of the first embodiment executes the above-described Algorithm 1: right shift protocol on integer ring $Z_q$. The secure right shift computation system 100 includes m ($\geq$3) secure computation apparatuses $1_1, \ldots, 1_m$ as shown in FIG. 1. In the embodiment, the secure computation apparatuses $1_1, \ldots, 1_m$ are each connected to a communication network 9. The communication network 9 is a circuit-switched or packet-switched communication network configured so that connected apparatuses can communicate with each other, and, for example, the Internet, a LAN (Local Area Network), and a WAN (Wide Area Network) can be used. Note that each apparatus does not necessarily need to be able to communicate online via the communication network 9. For example, information to be input into the secure computation apparatus $1_i$ (i=1, ..., m) may be stored on a portable recording medium, such as a magnetic tape or a USB memory, and may be input from the portable recording medium into the secure computation apparatus $1_i$ offline.

Figure 2:
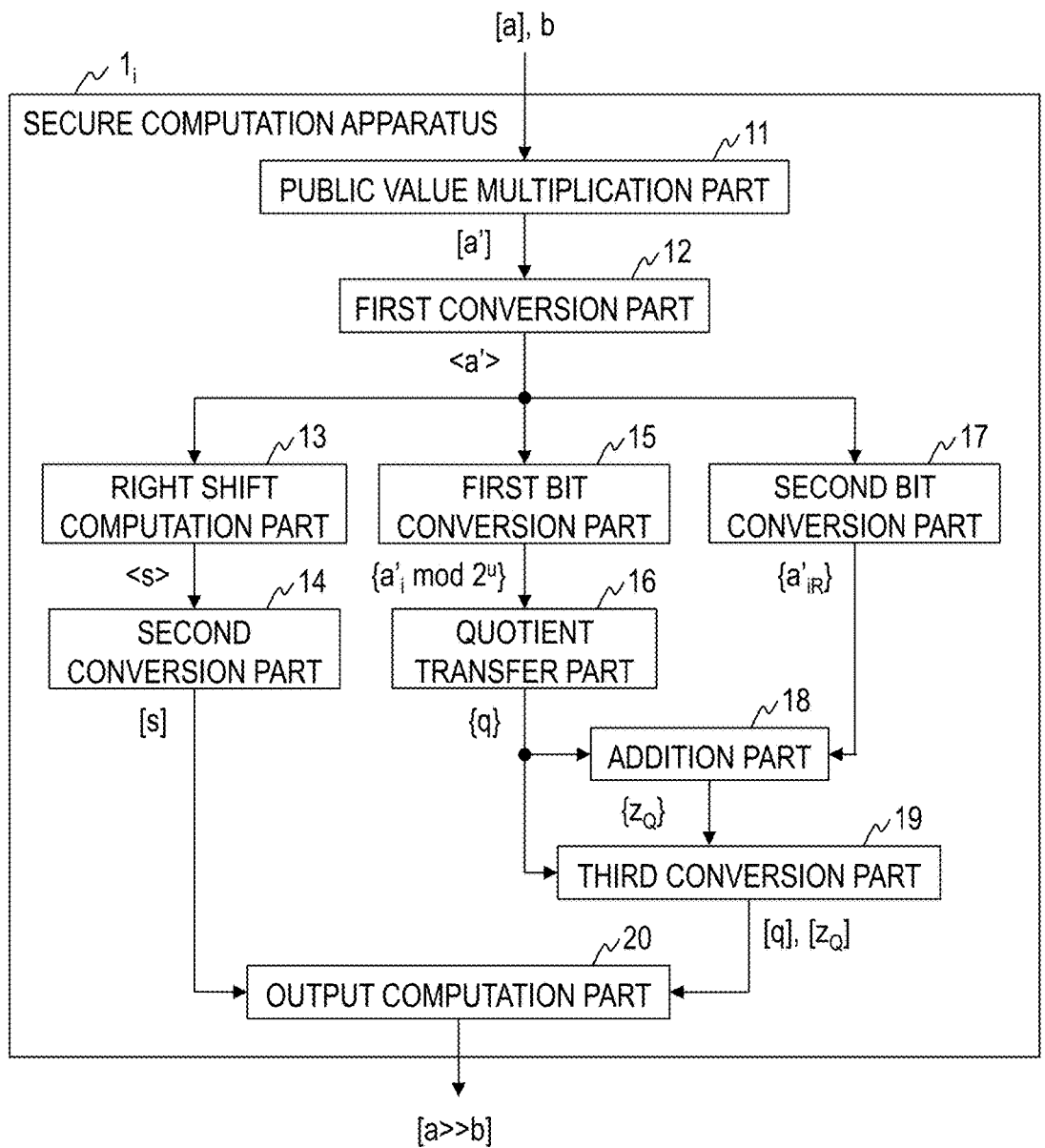
FIG. 2 is a diagram illustrating a functional configuration of a secure computation apparatus of a first embodiment.

The secure computation apparatus $1_i$ (i=1, ..., m) included in the secure right shift computation system of the first embodiment includes, for example, as shown in FIG. 2, a public value multiplication part 11, a first conversion part 12, a right shift computation part 13, a second conversion part 14, a first bit conversion part 15, a quotient transfer part 16, a second bit conversion part 17, an addition part 18, a third conversion $1_i$ performs processing of below-described steps while cooperating with another secure computation apparatus $1_{i'}$ (i'=1, ..., m, however, i≠i'), and thereby the secure right shift computation method of the first embodiment is implemented.

The secure computation apparatus $1_i$ is a special apparatus configured by loading a special program into a known or dedicated computer including, for example, a central processing unit (CPU) and a main memory (RAM: Random Access Memory). The secure computation apparatus $1_i$ performs each process, for example, under control of the central processing unit. Data input into the secure computation apparatus $1_i$ and data obtained in each process are stored, for example, in the main memory, and the data stored in the main memory is read out to the central processing unit as needed and used for another process. Each processing part of the secure computation apparatus $1_i$ may be at least partially composed of hardware such as integrated circuits.

Figure 3:
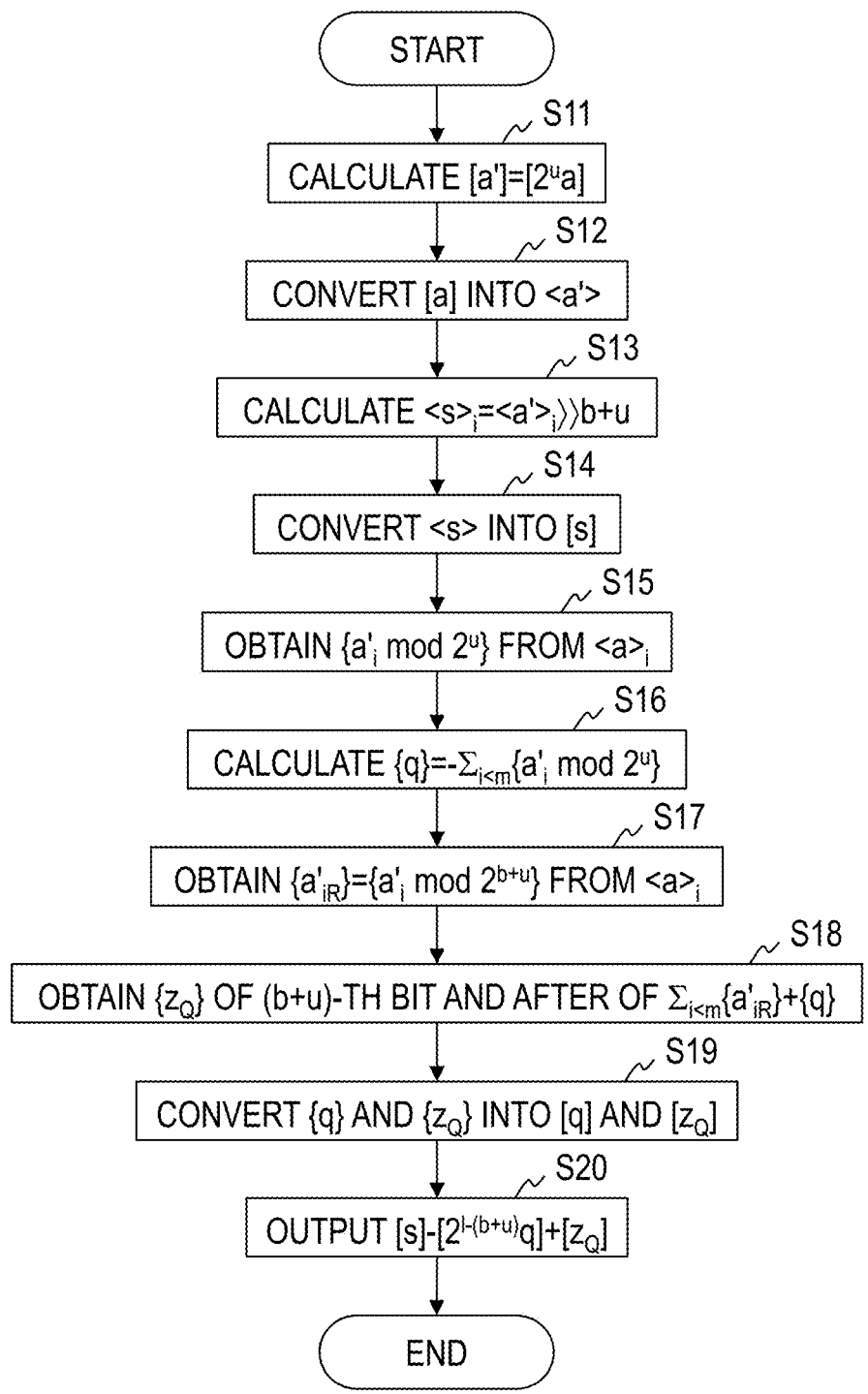
FIG. 3 is a diagram illustrating a processing procedure of a secure right shift computation method of the first embodiment.

A processing procedure of the secure right shift computation method executed by the secure right shift computation system 100 of the first embodiment will be described with reference to FIG. 3.

In step S11, the public value multiplication part 11 of each secure computation apparatus $1_i$ receives the distributed value [a] of a number to be shifted "a" input into the secure computation apparatus $1_i$, and calculates [a']=[$2^u$a] by public value multiplication. Here, "u" is an integer of log m or more, and "m" is a distribution number of additive secret sharing. The "u" and "m" are parameters given beforehand. The public value multiplication part 11 inputs the calculated distributed value [a'] into the first conversion part 12.

In step S12, the first conversion part 12 of each secure computation apparatus $1_i$ receives the distributed value [a'] from the public value multiplication part 11, and converts the distributed value [a'] into a distributed value $<a'>=<a'>_0, \ldots, <a'>_{m-1}$ of additive secret sharing. The first conversion part 12 inputs the converted distributed value $<a'>$ into the right shift computation part 13, the first bit conversion part 15, and the second bit conversion part 17.

In step S13, the right shift computation part 13 of each secure computation apparatus $1_i$ receives the distributed value $<a'>$ from the first conversion part 12, calculates $<s>_i=<a'>_i>>b+u$, and obtains a distributed value $<s>$. Here, $>>$ is a right shift operator. The right shift computation part 13 inputs the calculated distributed value $<s>$ into the second conversion part 14.

In step S14, the second conversion part 14 of each secure computation apparatus $1_i$ receives the distributed value $<s>$ from the right shift computation part 13, and converts the distributed value $<s>$ into linear secret sharing. The second conversion part 14 inputs the converted distributed value [s] into the output computation part 20.

In step S15, the first bit conversion part 15 of each secure computation apparatus $1_i$ receives the distributed value $<a'>$ from the first conversion part 12, distributes lower u bits of the share $<a'>_i$ of the distributed value $<a'>$, and obtains a distributed value $\{a'_i \bmod 2^u\}$, which is a bit expression of $<a'>_i \bmod 2^u$. The first bit conversion part 15 inputs the distributed value $\{a'_i \bmod 2^u\}$ into the quotient transfer part 16.

In step S16, the quotient transfer part 16 of each secure computation apparatus $1_i$ receives the distributed value $\{a'_i \bmod 2^u\}$ from the first bit conversion part 15, and calculates lower u bits of $-\Sigma_{i<m}\{a'_i \bmod 2^u\}$ by the addition circuit and the sign inversion circuit. A bit sequence of a calculation result is set as a distributed value {q} of a quotient "q." The quotient transfer part 16 inputs the distributed value {q} into the addition part 18 and the third conversion part 19.

In step S17, the second bit conversion part 17 of each secure computation apparatus $1_i$ receives the distributed value $<a'>$ from the first conversion part 12, distributes lower b+u bits of the share $<a'>_i$ of the distributed value $<a'>_i$ and obtains a distributed value $\{a'_{iR}\}$, which is a bit expression of $<a'>_i \bmod 2^{b+u}$. The second bit conversion part 17 inputs the distributed value $\{a'_{iR}\}$ into the addition part 18.

In step S18, the addition part 18 of each secure computation apparatus $1_i$ receives the distributed value {q} from the quotient transfer part 16 and the distributed value $\{a'_{iR}\}$ from the second bit conversion part 17, and calculates $\{z\}=\Sigma_{i<m}\{a'_{iR}\}+\{q\}$ by the addition circuit. A bit sequence of a (b+u)-th bit (0 start) and after of the bit sequence {z} of a calculation result is set as a distributed value $\{z_Q\}$. The addition part 18 inputs the distributed value $\{z_Q\}$ into the third conversion part 19.

In step S19, the third conversion part 19 of each secure computation apparatus $1_i$ receives the distributed value {q} from the quotient transfer part 16 and the distributed value $\{z_Q\}$ from the addition part 18, and converts {q} and $\{z_Q\}$ into linear secret sharing by bit composition. The third conversion part 19 inputs the converted distributed values [q] and $[z_Q]$ into the output computation part 20.

In step S20, the output computation part 20 of each secure computation apparatus $1_i$ receives the distributed value [s] from the second conversion part 14 and the distributed values [q] and $[z_Q]$ from the third conversion part 19, calculates $[s]-[2^{l-(b+u)}q]+[z_Q]$, and outputs as a distributed value [a>>b] of a value a>>b, which is obtained by shifting the number to be shifted "a" by the "b" bits toward the right.

<Effects>

Communication traffic and the number of rounds of the right shift protocol are evaluated. A coefficient is considered but a constant term is ignored. Since the value of "u" is assumed to be as small as one for passive and two for even active, evaluation is performed regarding "u" as a constant.

The communication traffic is as follows. The number of transmission bits per party is used as units. The conversion from linear secret sharing into additive secret sharing requires 0, the conversion from additive secret sharing into linear secret sharing requires "1," the distribution of lower b+u bits requires "b," the addition circuit requires "b," the sign inversion circuit requires 0, the bit composition requires "l" twice per one time, and the total is expressed as 3l+2b using the prime bit length "l" and the shift amount "b."

The number of rounds is as follows. The addition circuit requires b rounds, others are constant rounds, and the total is b rounds.

Second Embodiment

In the secure right shift computation system of the first embodiment, the second bit conversion part 17 and the addition part 18 have performed processing of approximating an error of the lower bits generated by right shift computation. However, the error that can be approximated is an error in a range that can be ignored in numerical calculation. Since a computation amount of the addition circuit is large in secure computation, by ignoring the error (that is, omitting the approximation processing), faster right shift computation can be achieved. A right shift protocol executed in a second embodiment is shown below.

[Algorithm 2: High-Speed Right Shift Protocol]

Input: a number to be shifted [a] and a shift amount b

Parameters: a distribution number m of additive secret sharing and an integer u of log m or more Output: [a>>b] (Where, >> is a right shift operator and represents shifting each bit of "a" by "b" bits toward the right.)

1: To calculate $[a']=[2^u a]$ by public value multiplication.
2: To convert [a'] into additive secret sharing to obtain <a'>.
3: To set <s> as $<s>_i=<a'>_i>>b+u$.
4: To convert <s> into linear secret sharing to obtain [s].
5: To distribute lower u bits of each $<a'>_i$ to obtain a bit expression $\{a'_i \bmod 2^u\}$ of $<a'>_i \bmod 2^u$.
6: To calculate lower u bits of $-\Sigma_{i<m}\{a'_i \bmod 2^u\}$ by an addition circuit and a sign inversion circuit. Since this output is equal to q by a quotient transfer theorem, it is set as $\{q\}$.
7: To convert $\{q\}$ into linear secret sharing by bit composition to obtain [q].
8: To output $[s]-[2^{l-(b+u)}q]+1$.

<Secure Right Shift Computation System 200>

Figure 4:
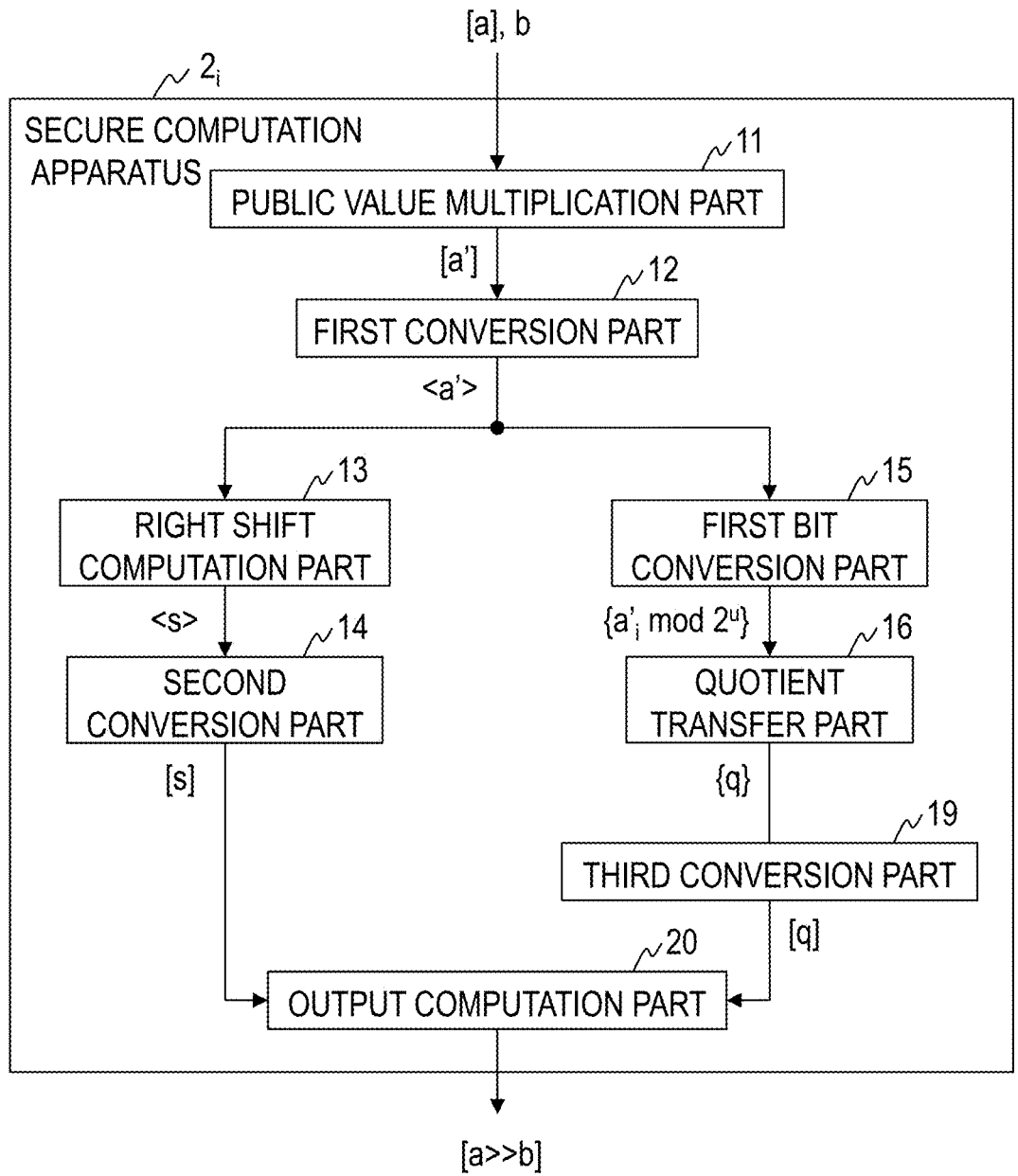
FIG. 4 is a diagram illustrating a functional configuration of a secure computation apparatus of a second embodiment.

A secure right shift computation system 200 of the second embodiment executes the above-described Algorithm 2: high-speed right shift protocol. A secure computation apparatus $2_i$ (i=1, . . . , m) included in the secure right shift computation system 200 of the second embodiment includes, for example, as shown in FIG. 4, a public value multiplication part 11, a first conversion part 12, a right shift computation part 13, a second conversion part 14, a first bit conversion part 15, a quotient transfer part 16, a third conversion part 19, and an output computation part 20. That is, the second bit conversion part 17 and the addition part 18 included in the secure computation apparatus $1_i$ (i=1, . . . , m) of the first embodiment are not included.

The secure computation apparatus $2_i$ performs processing of below-described steps while cooperating with another secure computation apparatus $2i'$ (i'=1, m, however, i≠i'), and thereby a secure right shift computation method of the second embodiment is implemented.

Figure 5:
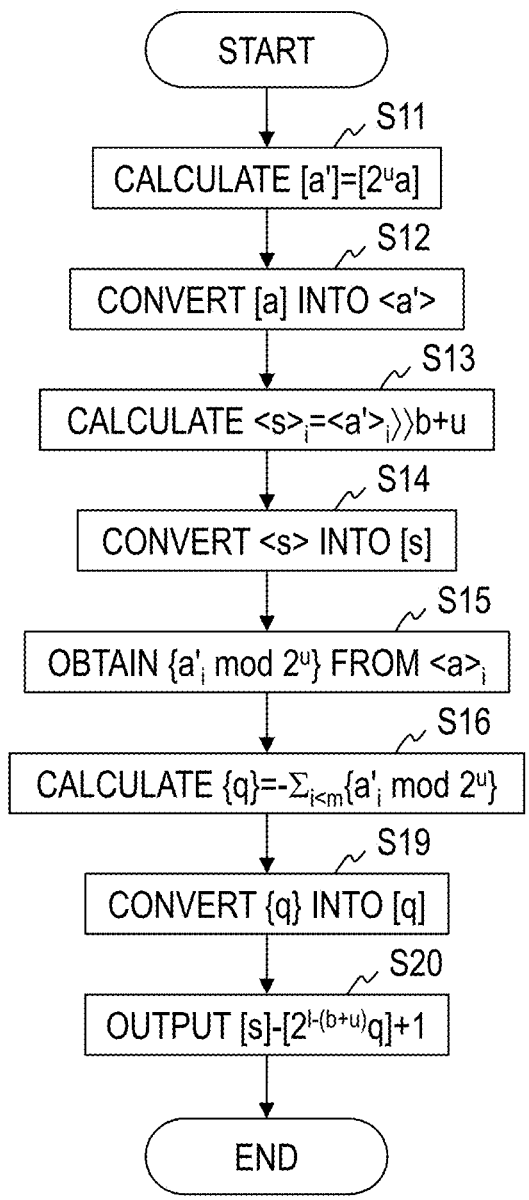
FIG. 5 is a diagram illustrating a processing procedure of a secure right shift computation method of the second embodiment.

A processing procedure of the secure right shift computation method executed by the secure right shift computation system 200 of the second embodiment will be described with reference to FIG. 5.

In step S11, the public value multiplication part 11 of each secure computation apparatus $2_i$ receives the distributed value [a] of a number to be shifted "a" input into the secure computation apparatus $2_i$, and calculates $[a']=[2^u a]$ by public value multiplication. The public value multiplication part 11 inputs the calculated distributed value [a'] into the first conversion part 12.

In step S12, the first conversion part 12 of each secure computation apparatus $2_i$ receives the distributed value [a'] from the public value multiplication part 11, and converts the distributed value [a'] into a distributed value $<a'>=<a'>_0, \ldots, <a'>_{m-1}$ of additive secret sharing. The first conversion part 12 inputs the converted distributed value <a'> into the right shift computation part 13 and the first bit conversion part 15.

In step S13, the right shift computation part 13 of each secure computation apparatus $2_i$ receives the distributed value <a'> from the first conversion part 12, calculates $<s>_i=<a'>_i>>b+u$, and obtains a distributed value <s>. The right shift computation part 13 inputs the calculated distributed value <s> into the second conversion part 14.

In step S14, the second conversion part 14 of each secure computation apparatus $2_i$ receives the distributed value <s> from the right shift computation part 13, and converts the distributed value <s> into linear secret sharing. The second conversion part 14 inputs the converted distributed value [s] into the output computation part 20.

In step S15, the first bit conversion part 15 of each secure computation apparatus $2_i$ receives the distributed value <a'> from the first conversion part 12, distributes lower u bits of a share $<a'>_i$ of the distributed value $<a'>_i$ and obtains a distributed value $\{a'_i \bmod 2^u\}$, which is a bit expression of $<a'>_i \bmod 2^u$. The first bit conversion part 15 inputs the distributed value $\{a'_i \bmod 2^u\}$ into the quotient transfer part 16.

In step S16, the quotient transfer part 16 of each secure computation apparatus $2_i$ receives the distributed value $\{a'_I \bmod 2^u\}$ from the first bit conversion part 15, and calculates lower u bits of $-\Sigma_{i<m}\{a'_i \bmod 2^u\}$ by the addition circuit and the sign inversion circuit. A bit sequence of a calculation result is set as a distributed value $\{q\}$ of a quotient "q." The quotient transfer part 16 inputs the distributed value $\{q\}$ into the third conversion part 19.

In step S19, the third conversion part 19 of each secure computation apparatus $2_i$ receives the distributed value $\{q\}$ from the quotient transfer part 16, and converts $\{q\}$ into linear secret sharing by bit composition.

The third conversion part 19 inputs the converted distributed value [q] into the output computation part 20.

In step S20, the output computation part 20 of each secure computation apparatus $2_i$ receives the distributed value [s] from the second conversion part 14 and the distributed value [q] from the third conversion part 19, calculates $[s]-[2^{l-(b+u)}q]+1$, and outputs as a distributed value [a>>b] of a value a>>b, which is obtained by shifting the number to be shifted "a" by the "b" bits toward the right.

Third Embodiment

Right shift computation can be regarded as division by powers of two. Therefore, in a third embodiment, extension to division by other than powers of two is considered. In the same manner as the shift amount is public in the right shift computation, a divisor is made a public value. In the third embodiment, it is assumed to use additive secret sharing in which the number of shares is two. That is, additive secret sharing used in internal processing is (2, 2) additive secret sharing, and secret sharing that is a form of input/output is (2, 3) linear secret sharing. A divisor public division protocol executed in the embodiment is shown below.

[Algorithm 3: Divisor Public Division Protocol (the Number of Shares is Two and the Divisor is an Integer without a Sign)]

Input: a dividend [a] and a divisor "d"
Output: [a/d] (Where, / represents division with a fractional part truncated.)

1: To convert [a] into (2, 2) additive secret sharing to obtain <a>.
2: To calculate $<a'>:=<2a>$ and $d'=2d$.
3: To obtain a quotient <q> where <a'> is divided by p by quotient transfer or the like.
4: To obtain a quotient p' and a residual r' where p is divided by d'.
5: To calculate the following formula to obtain <b>. Here, addition and subtraction are addition and subtraction on natural numbers rather than mod p.

$$\langle b \rangle_i := \begin{cases} (\langle a' \rangle_i + d' - 1 - r')/d' & \text{if } i = 0 \\ \langle a' \rangle_i / d' & \text{otherwise} \end{cases} \quad \text{[Formula 1]}$$

6: To calculate $\langle b \rangle - (p'+1)\langle q \rangle + 1$ to obtain as a result of $\langle a/d \rangle$.

7: To convert $\langle a/d \rangle$ into (2, 3) linear secret sharing to output [a/d].

<Secure Division System 300>

Figure 6:
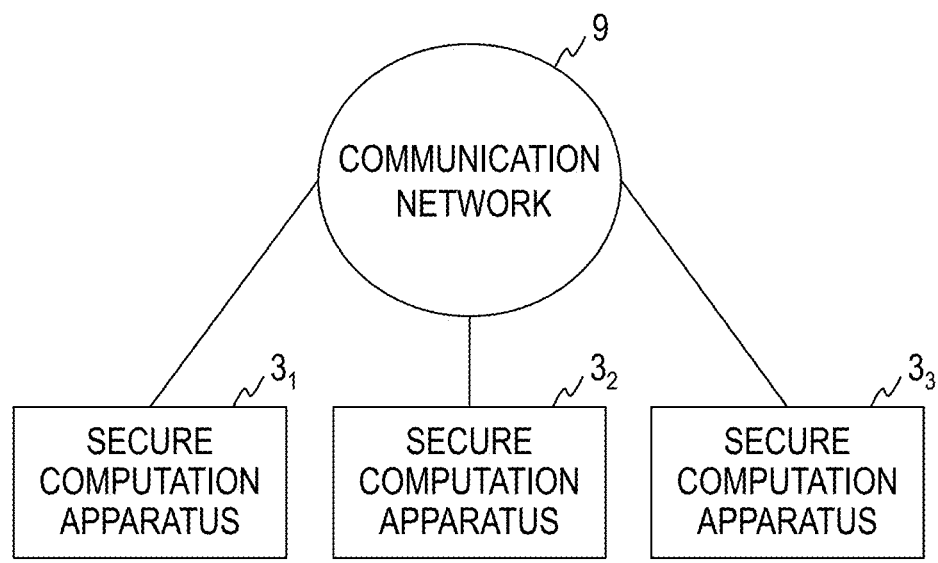
FIG. 6 is a diagram illustrating a functional configuration of a secure division system of a third embodiment.

A secure division system 300 of the third embodiment executes the above-described Algorithm 3: divisor public division protocol. The secure division system 300 includes three secure computation apparatuses $3_1$, $3_2$, and $3_3$ as shown in FIG. 6. In the embodiment, the secure computation apparatuses $3_1$, $3_2$, and $3_3$ are each connected to a communication network 9.

Figure 7:
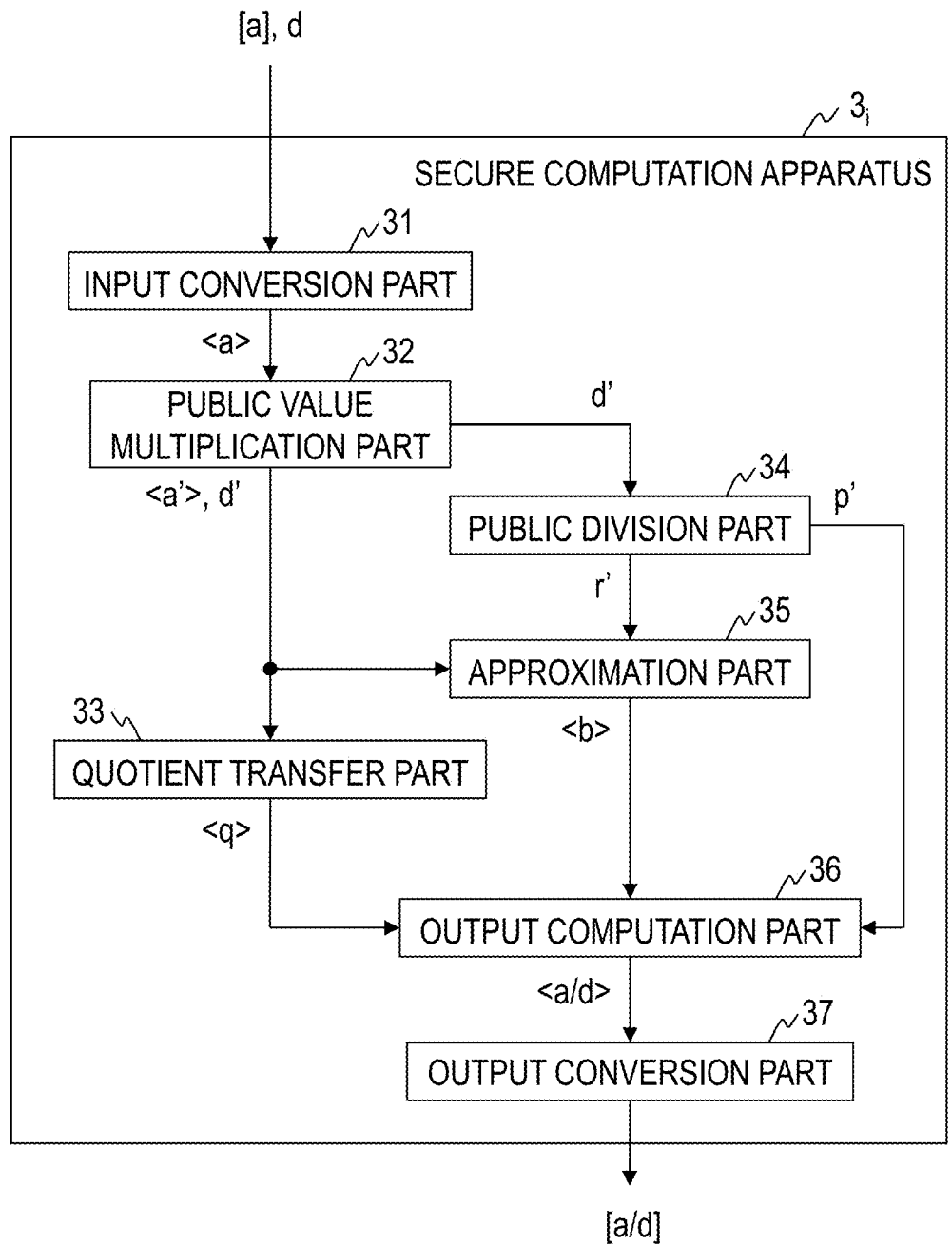
FIG. 7 is a diagram illustrating a functional configuration of a secure computation apparatus of the third embodiment.

The secure computation apparatus $3_i$ (i=1, ..., 3) included in the secure division system 300 of the third embodiment includes, for example, as shown in FIG. 7, an input conversion part 31, a public value multiplication part 32, a quotient transfer part 33, a public division part 34, an approximation part 35, an output computation part 36, and an output conversion part 37. The secure computation apparatus $3_i$ performs processing of below-described steps while cooperating with another secure computation apparatus $3_{i'}$ (i'=1, 3, however, and thereby a secure division method of the third embodiment is implemented.

Figure 8:
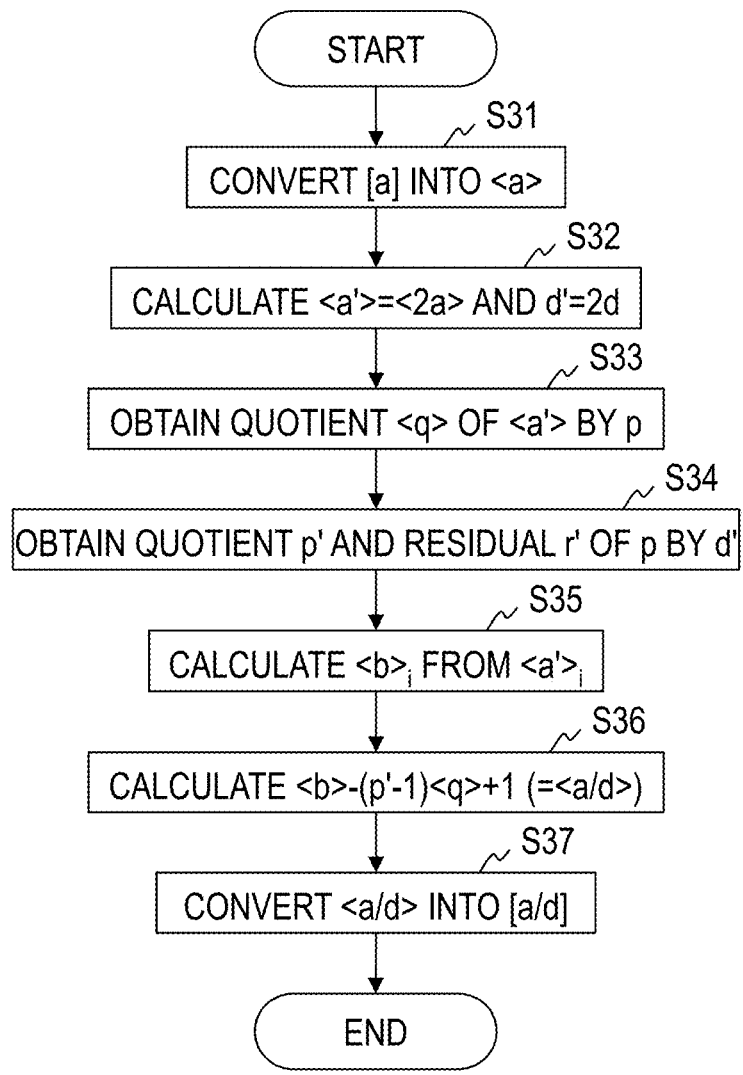
FIG. 8 is a diagram illustrating a processing procedure of a secure division method of the third embodiment.

A processing procedure of the secure division method executed by the secure division system 300 of the third embodiment will be described with reference to FIG. 8.

In step S31, the input conversion part 31 of each secure computation apparatus $3_i$ receives the distributed value [a] of a dividend "a" input into the secure computation apparatus $3_i$, and converts the distributed value [a] into a distributed value $\langle a \rangle = \langle a \rangle_0, \ldots, \langle a \rangle_1$ of (2, 2) additive secret sharing. The input conversion part 31 inputs the converted distributed value $\langle a \rangle$ into the public value multiplication part 32.

In step S32, the public value multiplication part 32 of each secure computation apparatus $3_i$ receives the divisor d input into the secure computation apparatus $3_i$ and the distributed value $\langle a \rangle$ input from the input conversion part 31, and calculates $\langle a' \rangle = \langle 2a \rangle$ and $d' = 2d$ by public value multiplication. The public value multiplication part 32 inputs the calculated distributed value $\langle a' \rangle$ and value d' into the quotient transfer part 33 and the approximation part 35. Also, the public value multiplication part 32 inputs the value d' into the public division part 34.

In step S33, the quotient transfer part 33 of each secure computation apparatus $3_i$ receives the distributed value $\langle a' \rangle$ and the value d' from the public value multiplication part 32, and obtains a distributed value $\langle q \rangle$ of a quotient "q" where the value a' is divided by a modulus "p" by quotient transfer or the like. Specifically, the processing performed by the first bit conversion part 15, the quotient transfer part 16, and the third conversion part 19 of the first embodiment should be executed. That is, the quotient transfer part 33 distributes lower u bits of the share $\langle a' \rangle_i$ of the distributed value $\langle a' \rangle_i$ obtains a distributed value $\{a'_i \bmod 2^u\}$, which is a bit expression of $\langle a' \rangle_i \bmod 2^u$, calculates lower u bits of $-\Sigma_{i<m}\{a'_i \bmod 2^u\}$ by an addition circuit and a sign inversion circuit, sets a bit sequence of a calculation result as a distributed value $\{q\}$ of the quotient "q," and converts $\{q\}$ into the distributed value $\langle q \rangle$ by bit composition. The quotient transfer part 33 inputs the distributed value $\langle q \rangle$ into the output computation part 36.

In step S34, the public division part 34 of each secure computation apparatus $3_i$ receives the value d' from the public value multiplication part 32 and obtains a quotient p' and a residual r' where the modulus "p" is divided by the value d'. The public division part 34 inputs the residual r' into the approximation part 35. Also, the public division part 34 inputs the quotient p' into the output computation part 36.

In step S35, the approximation part 35 of each secure computation apparatus $3_i$ receives the distributed value $\langle a' \rangle$ and the value d' from the public value multiplication part 32 and the residual r' from the public division part 34, and calculates the following formula.

$$\langle b \rangle_i := \begin{cases} (\langle a' \rangle_i + d' - 1 - r')/d' & \text{if } i = 0 \\ \langle a' \rangle_i / d' & \text{otherwise} \end{cases} \quad \text{[Formula 2]}$$

That is, if i=0, $\langle b \rangle_i = (\langle a' \rangle_i + d' - 1 - r')/d'$ is calculated, and otherwise, $\langle b \rangle_i = \langle a' \rangle_i / d'$ is calculated, and a distributed value $\langle b \rangle$ is obtained. The approximation part 35 inputs the distributed value $\langle b \rangle$ into the output computation part 36.

In step S36, the output computation part 36 of each secure computation apparatus $3_i$ receives the distributed value $\langle q \rangle$ from the quotient transfer part 33, the quotient p' from the public division part 34, and the distributed value $\langle b \rangle$ from the approximation part 35, and calculates $\langle b \rangle - (p'+1)\langle q \rangle + 1$. The output computation part 36 inputs a calculation result as a distributed value $\langle a/d \rangle$ of a/d into the output conversion part 37.

In step S37, the output conversion part 37 of each secure computation apparatus $3_i$ receives the distributed value $\langle a/d \rangle$ from the output computation part 36 and converts the distributed value $\langle a/d \rangle$ into (2, 3) linear secret sharing. The output conversion part 37 outputs the converted distributed value [a/d].

<Theorem 2: Error of Algorithm 3>

Algorithm 3 satisfies the following three properties. This is ideal as integer division for fixed-point numbers for numerical calculation with stochastic output. Note that / and ÷ are both operators representing division, but / is division in which the fractional part is truncated, whereas ÷ is real number division.

(1) "A fractional part of an expected value of output ~ a fractional part of a÷d" is satisfied and its approximation error is O(a÷p).

(2) The output is a/d or a/d+1 with a probability of 1−O(a÷p), which is minimum error width for matching the expected value to a÷d in an integer output. The worst value is a/d+2 with a probability of O(a÷p).

(3) Especially, when "a" is divisible by "d," the error is 0 with a probability of 1−O(a÷p).

<Effects>

Algorithm 3: Communication traffic and the number of rounds of divisor public division protocol are evaluated. The communication traffic is 5/3(|p|+1) bits. The number of rounds is two rounds. Divisor public division that satisfies both communication traffic O(|p|) and the number of rounds O(1) has not existed until now. A constant coefficient is as extremely small as two or less, and it can be said it is especially effective in applications that process a large volume of right shift (that is, division of powers of two) for repeating operations, for example, machine learning.

Fourth Embodiment

In the third embodiment, it has been assumed that the additive secret sharing with two shares is used. In a fourth embodiment, it is generalized to additive secret sharing with three or more shares or duplicate secret sharing. A divisor public division protocol executed in the embodiment is shown below.

[Algorithm 4: Divisor Public Division Protocol (the Number of Shares is Three or More)]

Input: a dividend [a] and a divisor "d"

Output: [a/d] (Where, / represents division with a fractional part truncated.)

1: To convert [a] into additive secret sharing with m (≥3) shares or duplicate secret sharing to obtain <a>.

2: To calculate <a'>:=<2$^u$a> and d':=2$^u$d.

3: To obtain a quotient <q> where <a'> is divided by p by quotient transfer or the like.

4: To obtain a quotient p' and a residual r' where p is divided by d'.

5: To set z=1 if r'≥d'/2 and z=0 otherwise.

6: To calculate the following formula to obtain <b>. Here, addition and subtraction are addition and subtraction on natural numbers rather than mod p.

$$\langle b \rangle_i := \begin{cases} (\langle a' \rangle_i + (d' - r') + (d' - r')/2)/d' & \text{if } i = 0 \\ \langle a' \rangle_i / d' & \text{otherwise} \end{cases} \quad \text{[Formula 3]}$$

7: To calculate <b'>$_i$=<p''> if a quotient p'' and a residual r'' obtained by dividing <b>$_i$ by d' satisfy r''≤d'/2−1, and calculate <b'>$_i$=<p''+1> if r''≥d'/2 to obtain <b'>. Note that d' is an even number since d':=2''d.

8: To calculate <b'>−(p'+z)<q>−1 to obtain as a result of <a/d>.

9: To convert <a/d> into linear secret sharing with m shares to output [a/d].

<Secure Division System 400>

Figure 9:
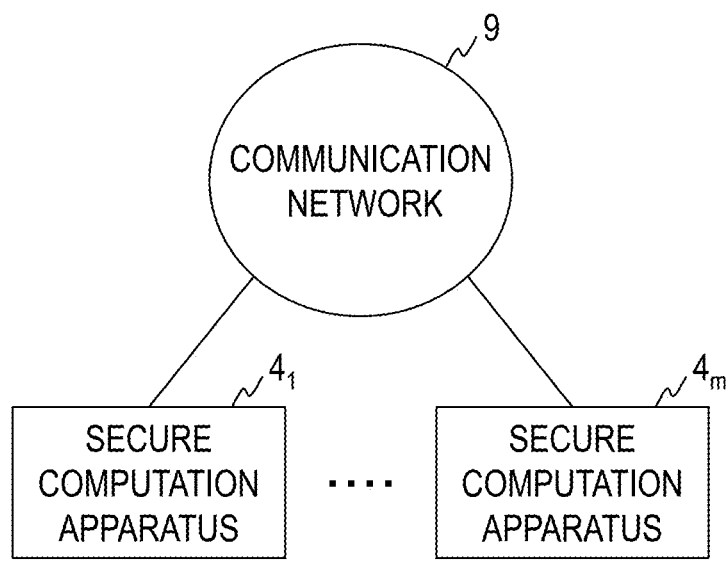
FIG. 9 is a diagram illustrating a functional configuration of a secure division system of a fourth embodiment.

A secure division system 400 of the fourth embodiment executes the above-described Algorithm 4: divisor public division protocol. The secure division system 400 includes m (≥3) secure computation apparatuses $4_1, \ldots, 4_m$ as shown in FIG. 9. In the embodiment, the secure computation apparatuses $4_1, \ldots, 4_m$ are each connected to a communication network 9.

Figure 10:
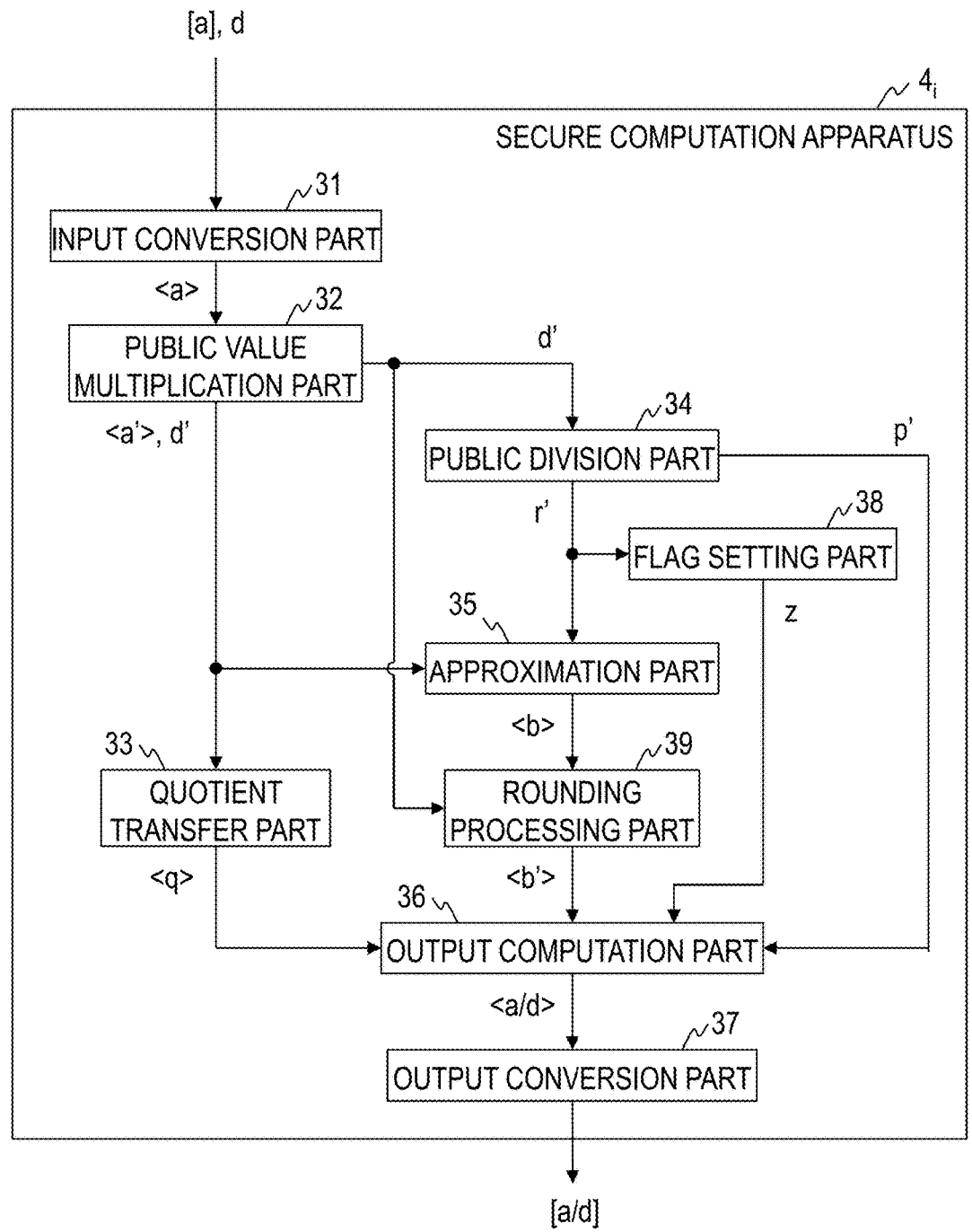
FIG. 10 is a diagram illustrating a functional configuration of a secure computation apparatus of the fourth embodiment.

The secure computation apparatus $4_i$ (i=1, ..., m) included in the secure division system 400 of the fourth embodiment includes, for example, as shown in FIG. 10, an input conversion part 31, a public value multiplication part 32, a quotient transfer part 33, a public division part 34, an approximation part 35, an output computation part 36, an output conversion part 37, a flag setting part 38, and a rounding processing part 39. That is, in addition to the processing parts included in the secure computation apparatus $3_i$ (i=1, ..., 3) of the third embodiment, the flag setting part 38 and the rounding processing part 39 are further included. The secure computation apparatus $4_i$ performs processing of below-described steps while cooperating with another secure computation apparatus $4_{i'}$ (i'=1, ..., m, however, and thereby a secure division method of the fourth embodiment is implemented.

Figure 11:
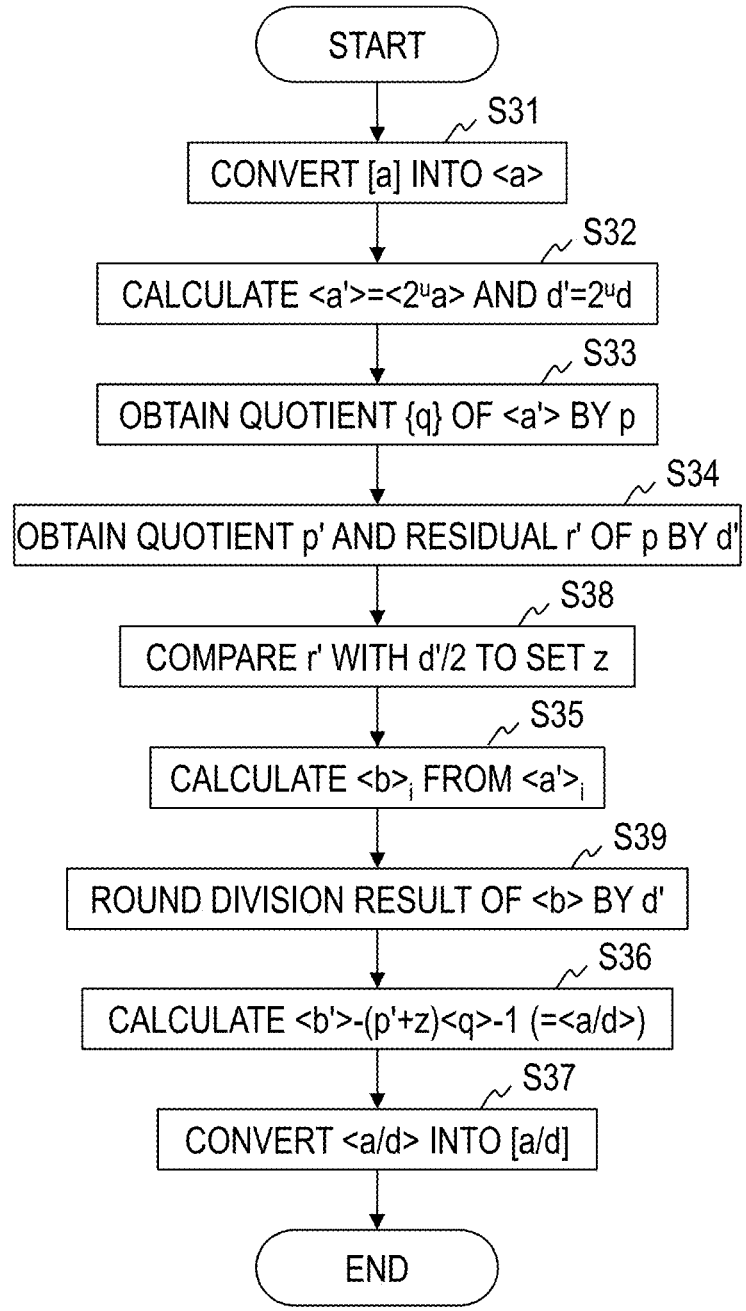
FIG. 11 is a diagram illustrating a processing procedure of a secure division method of the fourth embodiment.

A processing procedure of the secure division method executed by the secure division system 400 of the fourth embodiment will be described focusing on differences from the third embodiment with reference to FIG. 11.

In step S31, the input conversion part 31 of each secure computation apparatus $4_i$ receives the distributed value [a] of a dividend "a" input into the secure computation apparatus $4_i$, and converts the distributed value [a] into a distributed value <a>=<a>$_0, \ldots,$ <a>$_{m-1}$ of the additive secret sharing with m shares or the duplicate secret sharing. The input conversion part 31 inputs the converted distributed value <a> into the public value multiplication part 32.

In step S32, the public value multiplication part 32 of each secure computation apparatus $4_i$ receives the divisor d input into the secure computation apparatus $4_i$ and the distributed value <a> input from the input conversion part 31, and calculates <a'>=<2$^u$a> and d'=2$^u$d by public value multiplication. The public value multiplication part 32 inputs the calculated distributed value <a'> and value d' into the quotient transfer part 33 and the approximation part 35. Also, the public value multiplication part 32 inputs the value d' into the public division part 34 and the rounding processing part 39.

In step S38, the flag setting part 38 of each secure computation apparatus $4_i$ receives the residual r' from the public division part 34, and sets z=1 if r'≥d'/2 and z=0 otherwise. The flag setting part 38 inputs the set flag z into the output computation part 36.

In step S35, the approximation part 35 of each secure computation apparatus $4_i$ receives the distributed value <a'> and the value d' from the public value multiplication part 32 and the residual r' from the public division part 34, and calculates the following formula.

$$\langle b \rangle_i := \begin{cases} (\langle a' \rangle_i + (d' - r') + (d' - r')/2)/d' & \text{if } i = 0 \\ \langle a' \rangle_i / d' & \text{otherwise} \end{cases} \quad \text{[Formula 4]}$$

That is, if i=0, <b>$_i$=(<a'>$_i$+(d'−r')+(d'−r')/2)/d' is calculated, and otherwise, <b>$_i$=<a'>$_i$/d' is calculated, and a distributed value <b> is obtained. The approximation part 35 inputs the distributed value <b> into the rounding processing part 39.

In step S39, the rounding processing part 39 of each secure computation apparatus $4_i$ receives the value d' from the public value multiplication part 32 and the distributed value <b> from the approximation part 35, calculates <b'>$_i$=<p''> if a quotient p'' and a residual r'' obtained by dividing <b>$_i$ by d' satisfy r''≤d'/2−1, and calculates <b'>$_i$=<p''+1> if r''≥d'/2 to obtain <b'>. The rounding processing part 39 inputs the distributed value <b'> into the output computation part 36.

In step S36, the output computation part 36 of each secure computation apparatus $4_i$ receives the distributed value <q> from the quotient transfer part 33, the quotient p' from the public division part 34, the flag z from the flag setting part 38, and the distributed value <b'> from the rounding processing part 39, and calculates <b'>−(p'+z)<q>−1. The output computation part 36 inputs a calculation result as a distributed value <a/d> of a/d to the output conversion part 37.

In step S37, the output conversion part 37 of each secure computation apparatus $4_i$ receives the distributed value <a/d> from the output computation part 36 and converts the distributed value <a/d> into linear secret sharing with m shares. The output conversion part 37 outputs the converted distributed value [a/d].

Fifth Embodiment

In the third embodiment and the fourth embodiment, it has been assumed that a general integer without a sign is used for the divisor d. In a fifth embodiment, it is assumed that the divisor d is an integer with a sign. A division protocol executed in the embodiment is shown below.

[Algorithm 5: Divisor Public Division Protocol (the Divisor is an Integer with a Sign)]

Input: a dividend [a] and a divisor "d" (Here, "a" satisfies μ≤a≤M, in which μ<0 and M≥0.)

Output: [a/d] (Where, / represents division with a fractional part truncated.)
1: To obtain "w" that satisfies $-\mu \leq wd \leq 2^{|p|-u}$.
2: To obtain [(wd+a)/d] (=[w+a/d]) by Algorithm 3 or 4.
3: To subtract "w" from [w+a/d] to output [a/d].

A secure division system of the fifth embodiment executes the above-described Algorithm 5: divisor public division protocol. The secure division system of the fifth embodiment includes a plurality of secure computation apparatuses in the same manner as the third embodiment or the fourth embodiment, and each secure computation apparatus includes the same processing parts as those of the third embodiment or the fourth embodiment.

The input conversion part 31 of each secure computation apparatus receives the divisor d input into the secure computation apparatus, divides $2^{|p|-1}$ by d, and rounds up to obtain a number "w." The distributed value [a] of the dividend "a" input into the secure computation apparatus is updated with [wd+a]. Then, the updated distributed value [a] is converted into the distributed value <a> of predetermined additive secret sharing. The input conversion part 31 inputs the converted distributed value <a> into the public value multiplication part 32.

The output conversion part 37 of each secure computation apparatus receives a distributed value <a/d> from the output computation part 36 and converts the distributed value <a/d> into predetermined linear secret sharing. Since the input conversion part 31 has updated [a] with [wd+a], the distributed value [a/d] is actually [(wd+a)/d] (=[w+a/d]). Therefore, the output conversion part 37 subtracts "w" from the converted distributed value [a/d]. The output conversion part 37 outputs the subtracted distributed value [a/d].

The embodiments of the present invention have been described above, but specific configurations are not limited to those embodiments, and it goes without saying that even if there is a change or the like in design as appropriate without departing from the scope of the present invention, they are included in the present invention. The various processes described in the embodiments may be performed not only in chronological order according to the described order, but also in parallel or individually according to processing capacity of apparatuses that execute the processes or as needed.

[Program and Recording Medium]

When various processing functions in each apparatus described in the embodiments are implemented by a computer, processing contents of functions which each apparatus should have are described by a program. Then, the program is executed by the computer, and thereby the various processing functions in each apparatus are implemented on the computer.

The program describing the processing contents can be recorded on a computer-readable recording medium. The computer-readable recording medium may be any recording medium, for example, a magnetic recording device, an optical disk, a magneto-optical recording medium, and a semiconductor memory.

Distribution of this program is carried out, for example, by selling, transferring, or lending a portable recording medium such as a DVD or a CD-ROM on which the program is recorded. Furthermore, the program may be stored in a storage device of a server computer, transferred from the server computer to another computer via a network, and thereby distributed.

A computer that executes such a program, for example, first stores the program recorded on the portable recording medium or the program transferred from the server computer temporarily in its own storage device. Then, when executing processing, the computer reads the program stored in its own storage device and performs the processing according to the read program. As another execution form of the program, the computer may directly read the program from the portable recording medium and perform the processing according to the program, or further may sequentially perform processing according to a received program every time the program is transferred from the server computer to the computer. In addition, the program is not transferred from the server computer to the computer, and the above-described processing may be executed by a so-called ASP (Application Service Provider) type service that implements a processing function only by execution instructions and result acquisition. Note that the program in this form includes information which is used for processing by the computer and is similar to the program (data or the like that is not a direct command to the computer but has properties that define processing of the computer).

In this form, the apparatus is configured by executing the predetermined program on the computer, but at least part of the processing contents may be implemented by hardware.

What is claimed is:

1. A secure cryptographic right shift computation system comprising m secure computation apparatuses that perform a distributed secure computation by taking an input of a distributed value [a] of a value "a" and a shift amount "b," and calculating a distributed value [a>>b] of a value obtained by shifting the value "a" by "b" bits toward right, wherein [•] is a distributed value obtained by distributing a value "•" by first secret sharing, <•> is a distributed value obtained by distributing the value "•" by additive secret sharing among the m secure computation apparatuses, {•} is a distributed value obtained by distributing a bit expression of the value "•" among the m secure devices "•," the distributed value [•] and the distributed value <•> can be mutually converted, "a" is an arbitrary value, "b" is a shift amount, "m" is a distribution number of three or more, "u" is an integer of log m or more, "l" is a bit number of the value "a," and >> is a right shift operator, and wherein the secure computation apparatuses are interconnected by a network to cooperate in calculating the distributed value, and each include processing circuitry configured to:

calculate a distributed value $[a']=[2^u a]$ by using the distributed value [a];

convert the distributed value [a'] into a distributed value $<a'>=<a'>_0, \ldots, <a'>_{m-1}$ of the additive secret sharing;

generate, for each integer i of 0 or more and less than m, a distributed value $<s>=<s>_0, \ldots, <s>_{m-1}$ by calculating $<s>_i=<a'>_i>>b+u$;

convert the distributed value <s> into a distributed value [s] of the first secret sharing;

convert lower u bits of a share $<a'>_i$ of the distributed value <a'> into a distributed value $\{a'_i \bmod 2^u\}$ of a bit expression for each integer i of 0 or more and less than m;

calculate lower u bits of $-\Sigma_{i<m}\{a'_i \bmod 2^u\}$ to obtain as a distributed value {q} of a bit expression by using the distributed value $\{a'_i \bmod 2^u\}$;

convert the distributed value {q} into a distributed value [q] of the first secret sharing; and calculate $[s]-[2^{l-(b+u)}q]+1$ to obtain as the distributed value [a>>b] by using the distributed values [s] and [q].

2. The cryptographic secure right shift computation system according to claim 1,
wherein the processing circuitry is further configured to:
convert lower b+u bits of the share $<a'>_i$ into a distributed value $\{a'_{iR}\}=\{a'_i \bmod 2b+u\}$ of a bit expression for each integer i of 0 or more and less than m; and
calculate a distributed value $\{z\}=\Sigma_{i<m}\{a'_{iR}\}+\{q\}$ of a bit expression by using the distributed values $\{a'_{iR}\}$ and $\{q\}$, and obtains a bit sequence of a (b+u)-th bit and after of the distributed value $\{z\}$ as a distributed value $\{z_Q\}$,
wherein:
the processing circuitry converts the distributed values $\{q\}$ and $\{z_Q\}$ into distributed values [q] and $[z_Q]$ of the first secret sharing; and
the processing circuitry calculates $[s]-[2^{l-(b+u)}q]+[z_Q]$ to obtain as the distributed value [a>>b] by using the distributed values [s], [q], and $[z_Q]$.

3. A secure computation apparatus included in the cryptographic secure right shift computation system according to claim 1.

4. A non-transitory computer-readable recording medium on which a program recorded thereon for causing a computer to function as the cryptographic secure computation apparatus according to claim 3.

5. A cryptographic secure right shift computation method executed by a secure right shift computation system that includes m secure computation apparatuses that perform a distributed secure computation by taking an input of a distributed value [a] of a value "a" and a shift amount "b," and calculating a distributed value [a>>b] of a value obtained by shifting the value "a" by "b" bits toward right,
wherein [•] is a distributed value obtained by distributing a value "•" by first secret sharing among the m secure computation apparatuses, <•> is a distributed value obtained by distributing the value "•" by additive secret sharing among the m secure computation apparatuses, $\{•\}$ is a distributed value obtained by distributing a bit expression of the value "•," among the m secure computation apparatuses "•" the distributed value and the distributed value <•> can be mutually converted, "a" is an arbitrary value, "b" is a shift amount, "m" is a distribution number of three or more, "u" is an integer of log m or more, "l" is a bit number of the value "a," and >> is a right shift operator, and wherein the secure right shift computation method comprising, by processing circuitry of each of the secure computation apparatuses which are interconnected by a network to cooperate in calculating the distributed value::
calculating, a distributed value $[a']=[2^u a]$ by using the distributed value [a];
converting, the distributed value [a'] into a distributed value $<a'>=<a'>_0, \ldots <a'>_{m-1}$ of the additive secret sharing;
generating, for each integer i of 0 or more and less than m, a distributed value $<s>=<s>_0, \ldots, <s>_{m-1}$ by calculating $<s>_i=<a'>_i>>b+u$;
converting, the distributed value <s> into a distributed value [s] of the first secret sharing;
converting, lower u bits of a share $<a'>_i$ of the distributed value <a'> into a distributed value $\{a'_i \bmod 2^u\}$ of a bit expression for each integer i of 0 or more and less than m;
calculating, lower u bits of $-\Sigma_{i<m}\{a'_i \bmod 2^u\}$ to obtain as a distributed value $\{q\}$ of a bit expression by using the distributed value $\{a'_i \bmod 2^u\}$;
converting, the distributed value $\{q\}$ into a distributed value [q] of the first secret sharing; and
calculating, $[s]-[2^{l-(b+u)}q]+1$ to obtain as the distributed value [a>>b] by using the distributed values [s] and [q].

* * * * *

UNITED STATES PATENT AND TRADEMARK OFFICE
CERTIFICATE OF CORRECTION

PATENT NO. : 12,333,273 B2
APPLICATION NO. : 17/279096
DATED : June 17, 2025
INVENTOR(S) : Dai Ikarashi Page 1 of 1

It is certified that error appears in the above-identified patent and that said Letters Patent is hereby corrected as shown below:

In the Claims

Column 17, Line 5, "2b+u" should be -- $2^{b+u}$ --

Signed and Sealed this
Eleventh Day of November, 2025

John A. Squires
*Director of the United States Patent and Trademark Office*